US010516584B2

United States Patent
Vodopivec

(10) Patent No.: US 10,516,584 B2
(45) Date of Patent: Dec. 24, 2019

(54) SYSTEMS AND METHODS FOR EFFICIENT NETWORK CONVERSATION BANDWIDTH STATISTICS GATHERING

(71) Applicant: eSentire, Inc., Cambridge (CA)

(72) Inventor: Mario Vodopivec, Mississauga (CA)

(73) Assignee: ESENTIRE, INC., Cambridge (CA)

( * ) Notice: Subject to any disclaimer, the term of this patent is extended or adjusted under 35 U.S.C. 154(b) by 464 days.

(21) Appl. No.: 15/451,994

(22) Filed: Mar. 7, 2017

(65) Prior Publication Data
US 2018/0262406 A1 Sep. 13, 2018

(51) Int. Cl.
*H04L 12/26* (2006.01)
(52) U.S. Cl.
CPC ........ *H04L 43/022* (2013.01); *H04L 43/0876* (2013.01); *H04L 43/12* (2013.01)
(58) Field of Classification Search
CPC ... H04L 43/022; H04L 43/0876; H04L 43/12; H04L 43/026; H04L 43/16
USPC ........................................................ 709/224
See application file for complete search history.

(56) References Cited

U.S. PATENT DOCUMENTS

| | | | |
|---|---|---|---|
| 7,020,085 B2 | 3/2006 | Mimura et al. | |
| 7,995,496 B2 | 8/2011 | Knapp et al. | |
| 8,300,525 B1* | 10/2012 | Kohn | H04L 43/022 370/230 |
| 8,510,830 B2 | 8/2013 | Reilly | |
| 2006/0217923 A1* | 9/2006 | Ma | H04L 41/0893 702/179 |
| 2009/0133033 A1* | 5/2009 | Lindo | G06F 11/0778 718/108 |
| 2009/0274165 A1* | 11/2009 | Csaszar | H04L 47/724 370/443 |
| 2010/0037309 A1* | 2/2010 | Dargis | H04L 63/0272 726/13 |
| 2014/0269750 A1* | 9/2014 | Tsirkin | H04L 49/90 370/413 |
| 2015/0016255 A1* | 1/2015 | Bisht | H04L 47/11 370/235 |

(Continued)

OTHER PUBLICATIONS

Traffic Analysis—NBAR and Flow [Highlight Help & Support Centre]; Apr. 28, 2016; 6 Pages.

*Primary Examiner* — James E Springer

(57) ABSTRACT

Computer networks are monitored for usage and security purposes. A network intercept device (NID) monitors network traffic such as conversations between source and destination endpoints in the network. Bandwidth usage statistics may be maintained for each monitored endpoint (e.g. by source IP address). Rather than determining statistics for all active conversations during a particular monitoring period, which comprehensive statistics determining may tax NID processing and storage resources, statistics for a "top" number of conversations (N) may be determined. A lossy approach may be used to gather statistics over the period for up to N conversations of each monitored endpoint. When a new conversation commences during the period for which statistics are not being gathered, each of the monitored endpoint's conversations may be decayed. The new conversation is added for statistics gathering, replacing one of the N conversations, when the one conversation has sufficiently decayed to or below a threshold.

23 Claims, 5 Drawing Sheets

(56) References Cited

U.S. PATENT DOCUMENTS

2015/0120959 A1\* 4/2015 Bennett .................. H04L 47/10
709/233
2015/0124631 A1 5/2015 Edsall et al.

\* cited by examiner

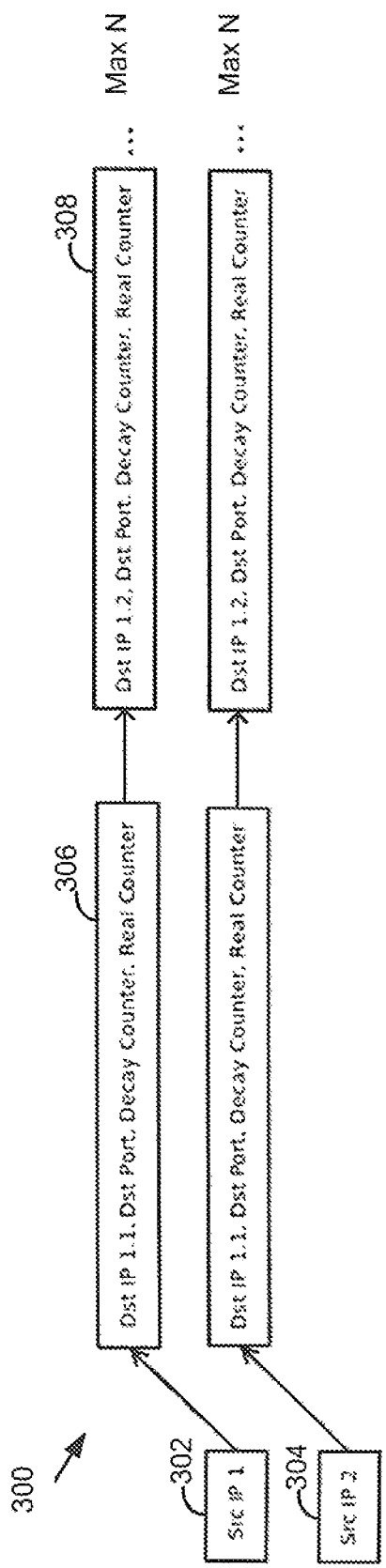
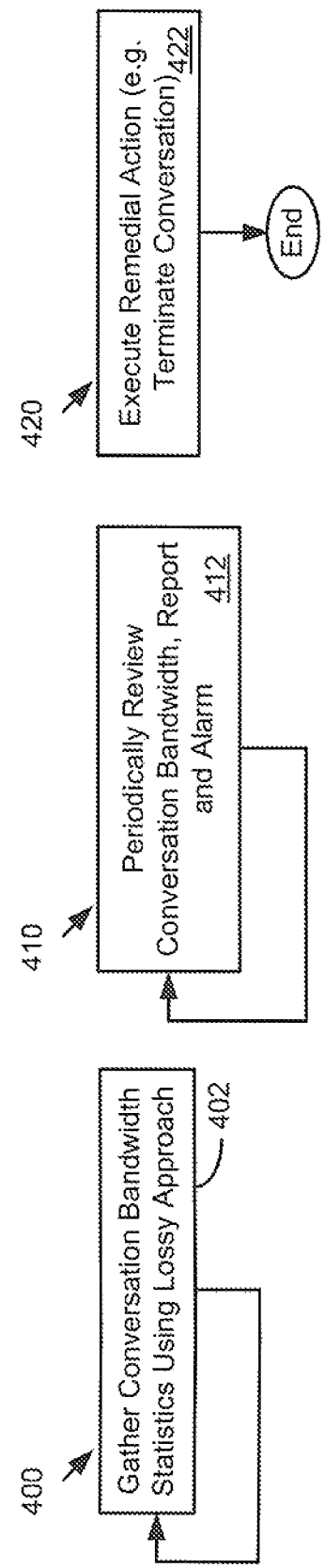
Figure 3
Figure 4A
Figure 4B
Figure 4C

402

502
Monitor Network Traffic for a Plurality of Monitored Endpoints in a Communication Network, at Least Some Monitored Endpoints Engaging in More than N Conversations During a Monitoring Period

504
Maintain Respective bandwidth Usage Counters and Decay Counters in Association with N Conversations for each of the at Least Some Monitored Endpoints

506
Receive Network Traffic for a New Conversation for a Particular Monitored Endpoint of the Least Some Monitored Endpoints, Which New Conversation is Not One of the N Conversations for Which a Bandwidth Usage Counter is Being Maintained

508
In Response to Receiving the Network Traffic for the New Conversation: Decay Respective Decay Counters Associated With Each of the N Conversations for the Particular Monitored Endpoint; and When the Decay Counter of a One of the N Conversations for the Particular Monitored Endpoint is Sufficiently Decayed Relative to a Threshold: Replace the Bandwidth Usage Counter, Decay Counter and Association with the one of the N Conversations with a Bandwidth Usage Counter, Decay Counter and Association with the New Conversation and Optionally For Each Other of the N Conversations for the Particular Monitored Endpoint, Replace the Decay Counter with the Respective Bandwidth Usage Counter

Figure 5

SYSTEMS AND METHODS FOR EFFICIENT NETWORK CONVERSATION BANDWIDTH STATISTICS GATHERING

FIELD

This application relates to computer network usage and security and more particularly to systems and methods for efficient network conversation bandwidth statistics gathering.

BACKGROUND

An out-of-band network intercept device (NID) sits atop/beside an in-band network device to monitor network traffic between endpoint devices of an enterprise and those outside. Suspicious connections can be detected and reset. One feature that is monitored is excessive bandwidth usage such as by internet protocol (IP) address.

A simple look-up table by (Source IP, Destination IP and Destination Port) can be used to hold a counter for each conversation. But such a table can be prohibitively large, causing a large memory footprint and excessive CPU time for look-ups and to add information. For example, 5000+ enterprise IP addresses may be monitored in some network configurations. The NID must remain efficient and cost effective.

DESCRIPTION OF THE DRAWINGS

FIG. 3 illustrates an example data structure to maintain network conversation bandwidth statistics.

FIGS. 4A-4C, 5 and 6 are flowcharts illustrating example operations of a network intercept device in accordance with one or more aspects of the present disclosure.

DETAILED DESCRIPTION

Figure 1:
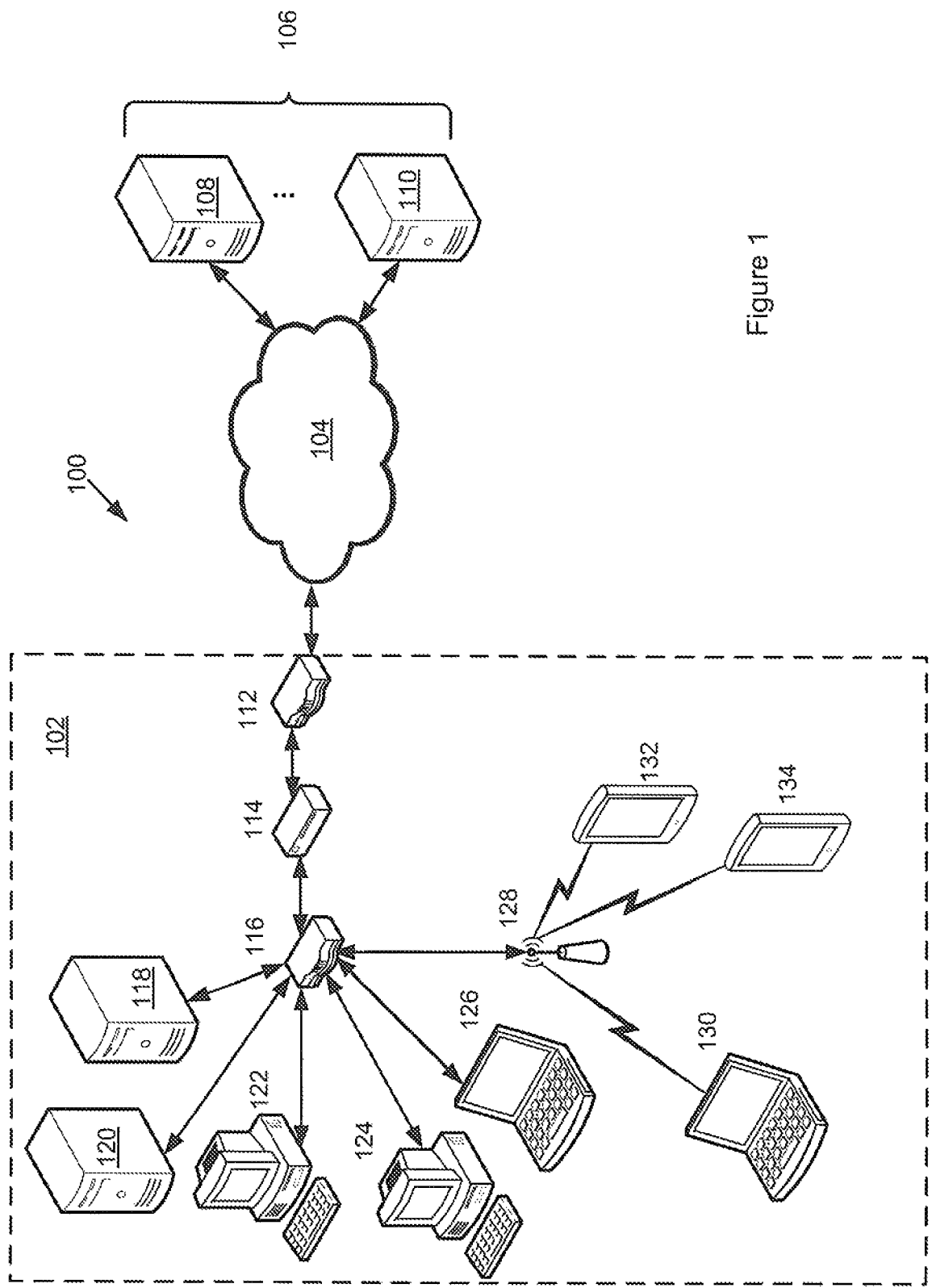
FIG. 1 illustrates a representative communications network in accordance with the prior art.

Computer networks are monitored for usage and security purposes. A network intercept device (NID) monitors network traffic such as conversations between source and destination endpoints in the network. Bandwidth usage statistics may be maintained for each monitored endpoint (e.g. by source IP address). Rather than determining statistics for all active conversations during a particular monitoring period, which comprehensive statistics determining may tax NID processing and storage resources, statistics for a "top" number of conversations (N) may be determined. A lossy approach may be used to gather statistics over the period for up to N conversations of each monitored endpoint. When a new conversation commences for which statistics are not being gathered during the period, each of the monitored endpoint's conversations in the data structure may be decayed. The new conversation is added for statistics gathering, replacing one of the N conversations in the data structure, when the one conversation has sufficiently decayed to or below a threshold. The other N conversations may be topped up relative to their respective measure of decay when a new conversation is added to minimize time bias in the statistics gathering.

A map and vector (or other) data structure may be utilized that is keyed on the source IP address of each monitored endpoint. The vector links up to N conversation data structures (entries) storing statistics for respective conversations of the monitored endpoint. Network packet traffic is monitored, parsing the packets for conversation identifiers (source IP, destination IP and destination port) as well as packet length or packet count. As a conversation is detected, the map is searched for the source IP and a new entry is added if not located, establishing a monitored endpoint in the map. A vector is added at the new entry to a conversation data structure storing the destination IP address and port as well as conversation counters for bandwidth usage and decay. Up to N conversations may be linked by respective vectors in a chain as new conversations are determined from the monitored packets. To gather the statistics for each particular conversation in the map, the bandwidth usage and decay counters in the respective conversation data structure are incremented by the packet length of the current packet or by a packet count.

When the vector data structure is storing statistics for N conversations for a particular monitored endpoint and a new conversation for the particular monitored endpoint is determined not to be in the data structure (i.e. statistics are not being gathered for it), each of the decay counters of the N conversations in the data structure are decremented by the packet length of the current packet (i.e. of the new conversation) or packet count. If one of these N conversations for the monitored endpoint is sufficiently decayed, for example the decay counter is at or below a threshold (which may be a count of 0), the one of these N conversations may be replaced with the new conversation for gathering its statistics. The remaining conversations may have their decay counters topped up, such as with the respective values of the respective bandwidth usage counters.

FIG. 1 illustrates a representative communication network 100 in accordance with the prior art. There is shown an enterprise network 102 coupled for communication to a wide area network 104 such as the Internet. Network 104 is coupled for communication with a plurality or endpoints 106 such as servers 108 and 110. It is understood that representative communication network 100 is simplified for illustrative purposes. Though endpoints 106 are depicted as servers, other communication devices may be coupled for communications. Additional networks may also be coupled to network 104 and/or to enterprise network 102.

Enterprise network 102 comprises an Internet facing network component 112, an NID 114 and a local area network (LAN) component 116. LAN component 116 may couple a plurality of components for communication within the enterprise and/or externally to network 104 such as servers 118, 120, desktop computing devices 122, 124, laptop device 126 and via a wireless routing device 128, laptop 130 and wireless devices 132 and 134. Wireless devices may be tablets, smartphones, smart appliances, or other wireless communication devices which may or may not be mobile. The various networks depicted typically comprise Internet protocol based networks. Traffic is sent in data packets between source and destination endpoints in the network having a respective a source IP address and a destination IP address and port. Each packet identifies the source IP address and a destination IP address and port as a well as a pack length representative of a quantity of data or bandwidth for the packet. Data transmitted between the source and destination endpoints may be defined as a conversation and a packet length total accumulated over a period of monitoring may define bandwidth usage in the period.

NID 114 is depicted between network devices 112 and 116. It may also be configured to communicate out of band, for example, a top or adjacent component 112 without direct coupling to component 116. Similarly an NID component may be configured in a network to monitor local traffic, for example, sitting a top component 116. NID may be configured as a network appliance for cyber security threat detection and prevention.

NID 114 monitors network packets, parsing the packets to determine respective conversations and gathering statistics for such conversations, possibly among other tasks. Such statistics may be logged and/or otherwise reported such as on a periodic basis. Alarms may be triggered in accordance with various rules, policies or other configurations.

NID 114 may be configured to take remedial action such as on detection of network security or other policy breaches responsive to one or more alarms detected or otherwise triggered such as in response to an input received. In one example, NID 114 may be configured to terminate a conversation such as by injecting one or more packets into device 112 and/or 116 to trigger a conversation reset or other response.

Figure 2:
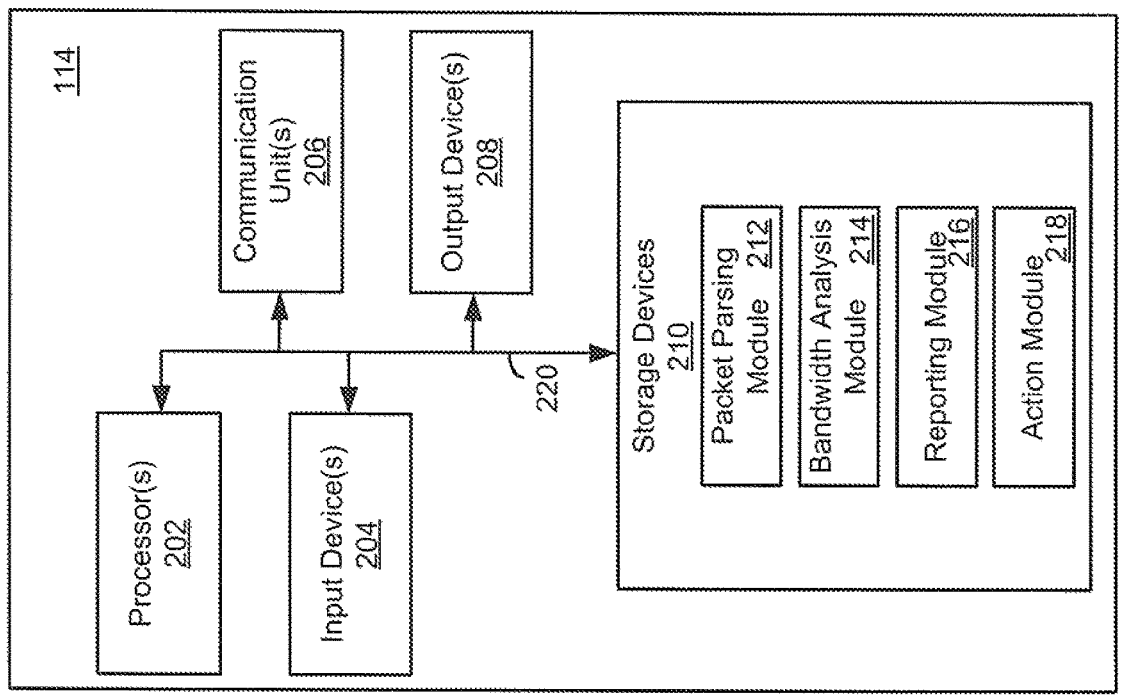
FIG. 2 illustrates a network intercept device in block form in accordance with one or more aspects of the present disclosure.

FIG. 2 illustrates a NID in block form in accordance with one or more aspects of the present disclosure, for example to provide methods and systems for efficient network conversation bandwidth statistics gathering. NID 114 comprises one or more processors 202, one or more input devices 204, one or more communication units 206 and one or more output devices 208. Communication units 206 may include a physical network interface and/or "network listening interface. These interfaces may not have to initiate or receive any network connection or be configured to do so, they are typically in a listening mode with no IP address assigned to the interface. NID 214 also includes one or more storage devices 210 storing one or more modules such as packet parsing module 212, bandwidth analysis module 214, reporting module 216 and action module 218. Communication channels 220 may couple each of the components 202, 204, 206, 208, 210, 212, 214, 216 and 218 for inter-component communications, whether communicatively, physically and/or operatively. In some examples, communication channels 220 may include a system bus, a network connection, an inter-process communication data structure, or any other method for communicating data.

One or more processors 202 may implement functionality and/or execute instructions within NID 114. For example, processors 202 may be configured to receive instructions and/or data from storage devices 210 to execute the functionality of the modules shown in FIG. 2, among others (e.g. operating system, communications, user interface, etc.) NID 114 may store data/information to storage devices 210. Some of the functionality is described further herein below.

One or more communication units 206 may communicate with external devices such as components 112 and 116 via one or more networks by transmitting and/or receiving network signals on the one or more networks. Though a NID 114 may use communication units in one or more configurations, because it is monitoring significant traffic on high-speed networks, it is typically configured for efficient processing and communication. As such, an example communication unit includes a network intercept card/device (e.g. such as an Ethernet card).

Input and output devices may include any of one or more buttons, switches, pointing devices, a keyboard, a microphone, one or more sensors (e.g. biometric, GPS, etc.) a speaker, a bell, one or more lights, etc. NID 114 may also include one or more I/O devices such as a touch sensitive or presence sensitive display. One or more of same may be coupled to NID 114 via a universal serial bus (USB) or other communication channel (e.g. 220). As a network monitoring component however, NID 114 is usually configured with few "unnecessary" components as it is not a personal computing device configured to assist a user.

The one or more storage devices 210 may store instructions and/or data for processing during operation of NID 114. The one or more storage devices may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

FIG. 3 illustrates examples 300 of a data structure to maintain efficient network conversation bandwidth statistics in the one or more storage devices 210. There is shown a plurality of map entries 302, 304 each storing a source IP address for a monitored endpoint in the network and each having a respective pointer or vector to respective chains of up to a maximum of N conversation entries (e.g. 306 and 308). Each conversation entry stores a respective destination IP address and port, a decay counter and a bandwidth usage counter. The decay counter is used to age the conversation entry and the bandwidth usage counter is used to keep a real count of bandwidth used by the conversation during the period of monitoring. Each conversation is defined by the conversation identifiers (i.e. source IP address, destination IP address and port). Each conversation entry may have a pointer or vector to the next conversation entry in the chain. The last entry may store a null pointer indicating the end of the chain, for example.

FIGS. 4A-4C illustrate operations of a network intercept device 114 in accordance with an example. With respect to FIG. 4A, operations 400 may be provided by modules 212 and 214 for example. With respect to FIG. 4B operations 410 may be provided by module 216 and with respect to FIG. 4C operations 420 may be provided by module 218.

It is understood that operations may not fall exactly within the modules of FIG. 2 such that one module may assist with the functionality of another. Operation 402 gathers conversation bandwidth statistics using a lossy approach as described further. Such operations may be configured to gather statistics over a defined period of time (e.g. a few minutes) and repeat continuously to update the statistics. Operation 412 periodically reviews the conversation bandwidth statistics and reports same (e.g. via a log or other manner). Operations 402 and 412 may be coordinated such that as the monitoring period terminates, the periodic review may be triggered. In another example, the periodic review may trigger the operation 402 to start a new monitoring period.

Operation 412 may raise an alarm in response to the review of the statistics, such as when the bandwidth for a conversation exceeds a defined threshold in one or more monitoring periods. In other examples, operation 412 may simple report the statistics and not engage in review or alarming. Such activities may be performed by another entity in the network (not shown), such as a network control entity, which may be local to the enterprise network 102 or remote therefrom.

Operation 422 may execute a remedial action, for example in response to one or more alarms. A remedial action may terminate the conversation between the network endpoints (e.g. the source IP and the destination IP and port).

Figure 6:
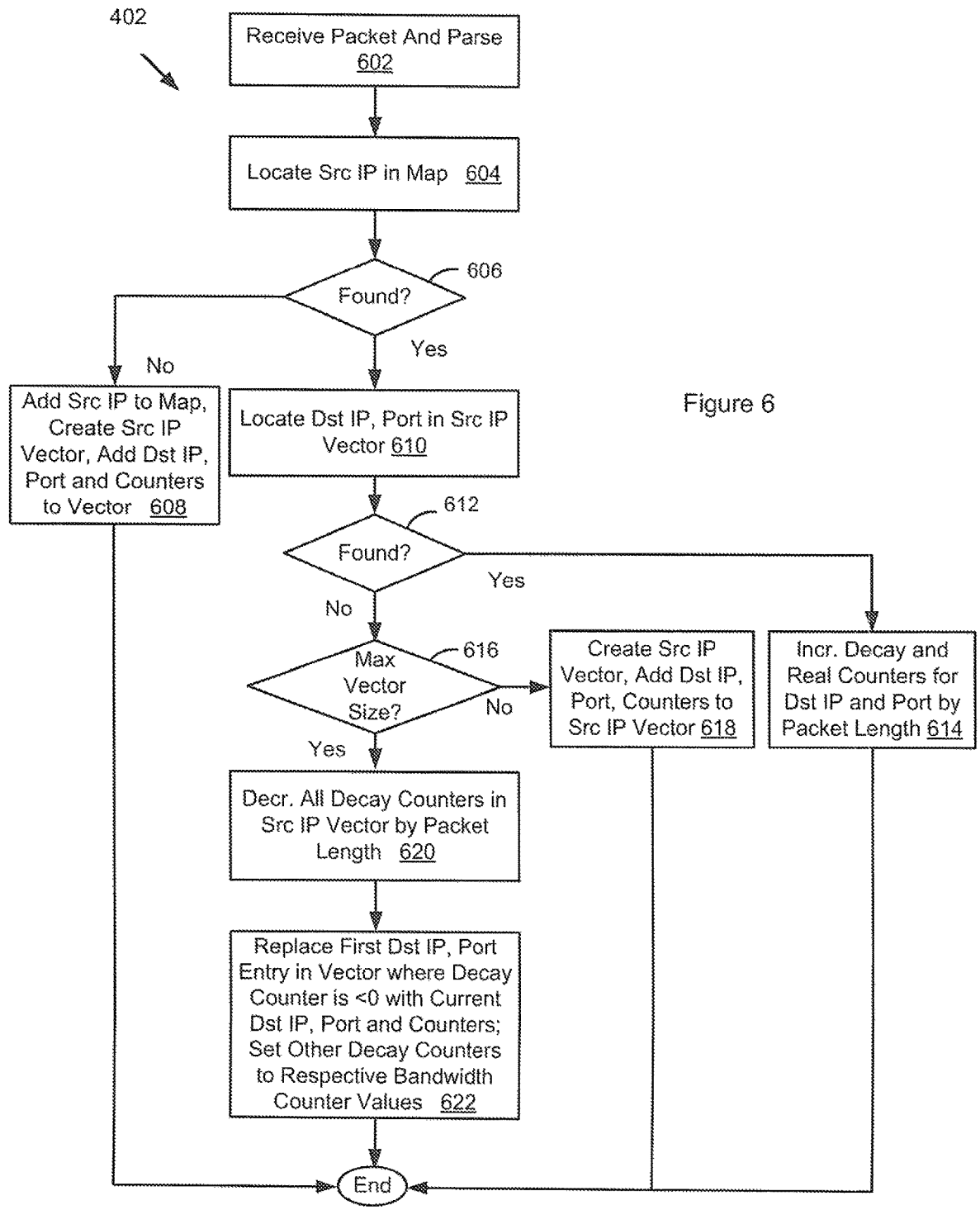

FIGS. 5 and 6 illustrate operation 402 of FIG. 4A in further detail and in accordance with an example. At 502, operations monitor network traffic for a plurality of monitored endpoints in a communication network. At least some monitored endpoints of the plurality of monitored endpoints engage in more than N conversations during a monitoring period. Some may engage in fewer.

At 504 operations maintain respective bandwidth usage counters and decay counters in association with N conversations for each of the at least some monitored endpoints. For endpoints engaging in fewer conversations, respective counters for fewer than N conversations are maintained.

At 506, operations receive network traffic for a new conversation for a particular monitored endpoint of the least some monitored endpoints, which new conversation is not one of the N conversations for which a bandwidth usage counter is being maintained.

At 508, in response to the network traffic for the new conversation: operations decay respective decay counters associated with each of the N conversations for the particular monitored endpoint. Further operations at 508 may replace a bandwidth usage counter and decay counter of one of the N conversations for the particular monitored endpoint with a bandwidth usage counter and decay counter associated with the new conversation when the decay counter of the one of the N conversations for the particular monitored endpoint is sufficiently decayed relative to a threshold. Further, and preferably at this time, in each other of the N conversations the decay counter is replaced with the respective bandwidth usage counter. This decay counter replacement "tops up" the decay counters of existing conversations so as to prefer such conversations over newer conversations for which counters are being maintained. In an alternative approach, the decay counters need not be topped up. If no decay counter has sufficiently decayed then no counter replacement is necessary. Operations 402 may repeat during the monitoring period for example and for successive periods.

FIG. 6 shows an example with respect to a single packet. At 602 operations receive a new packet and parse it for the conversation identifiers and packet length. At 604 map is searched for the source IP (Src IP). If the source IP is not found, via the "No" branch from decision 606, operations at 608 add the source IP to the map, create a source IP vector to a conversation entry and add the destination IP (dst IP) and port and two counters to the entry. The two counters are set at the packet length.

If the source IP is found, via the "Yes" branch from decision 606, operations at 610 search for the destination IP and port in the vector (chain of conversation entries from the map). If such is found, via the "Yes" branch from decision 612, operations at 614 increment the decay and bandwidth usage counters by the packet length. If not found, via "No" branch at decision 612, operations at 616 determine whether N conversation entries are in the chain (i.e. max. vector size reached?). If fewer entries are in the vector chain, there is room for another conversation. From 616 via the "No" branch, at 618 operations create a source IP vector to a conversation entry and add the destination IP and port and two counters to the entry. The two counters are set at the packet length.

If the maximum number of conversations are being monitored (i.e. N conversations), via yes branch to step 620, operations decay (decrement) all the decay counters in the chain by the packet length. At 622, one of the conversation entries in the vector chain may be replaced with the conversation identifiers of the current packet and the counters set at the packet length if the decay counter of the conversation entry is at or below a threshold (e.g. below 0). The first entry in the vector chain located may be the entry replaced, for example. Preferably, in each of the other conversations in the vector chain, each respective decay counter may be set to the current value of each conversation's respective bandwidth usage counter. This tops up the decay counters for existing conversations with a view to lessening a time bias inherent to this lossy approach. Leaving the decay counters "as is" at the time a new conversation is substituted in the data structure could misrepresent activity levels of the other remaining conversations, discounting previous activity during the monitoring period. This may be true particularly for longer monitoring periods or where activity is bursty in nature. Leaving the decay counters as is may provide an operable solution but may be less accurate than topping up.

Though not shown, at the end of a monitoring period, the map may be reset (emptied) as a low cost approach to readying the monitoring for the next period.

Keeping a maximum number of conversations (N) by decaying conversations being monitored helps keep the data storage resources from over expanding. Choosing the maximum number N of conversations to monitor may be responsive to assumptions about what type of activities typical network endpoint entities are expected to engage in and/or by experiment. In some environments N may be 10 to keeps statistics for up to 10 conversations per monitored endpoint. Restricting conversation monitoring to the top N in the manner described is "lossy" in nature as traffic over the tracked time interval can be discarded, mostly from low-bandwidth conversations. However, such is not expected to pose difficulties as lower bandwidth conversations are not usually problematic within the network 102.

The manner described may be biased toward conversations that arrive later within a monitoring period (time interval), and may make them appear higher in traffic than conversations that had most of their traffic happen in the beginning of the interval. This may have a more pronounced effect with long tracking intervals. Setting decay counters to bandwidth usage counter values when a conversation is replaced may reduce this bias. In practice, however, this bias when such counters are not set (topped up) is not expected to be problematic. If a particular conversation is bursty, experiences lags or other issues, it could drop out of monitoring and then return later. Its real counter of bandwidth usage will be lower that the true amount.

While the above description utilizes packet length for respective counters, a simple count of packet instances (a packet count) could be substituted using an assumption that a count of packets is sufficiently proportional to length in higher bandwidth conversations—i.e. higher bandwidth conversations have more packets than lower bandwidth conversations. Because a particular conversation may be removed and re-added for monitoring during a monitoring period, the bandwidth usage counter may not represent a true count at the end of the period. While the above description references a map and vector approach to data structures, other approaches may be used. Conservative uses of storage resources having quick storage and retrieval responses (low overhead) are preferred. The NID shown and described receives packets (raw packet data) in real-time and performs the analysis and counts in real-time. It is understood that packet data may be logged to a logging source and such data could be received and analyzed for statistics gathering purposes using the teachings herein. See for example, Cisco IOS® NetFlow features available on Cisco routers, among other logging features of other providers.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

While the techniques of this disclosure may be implemented in a wide variety of devices or apparatuses, an integrated circuit (IC) or a set of ICs (e.g., a chip set), as noted, a preferred device is a network intercept device coupled adjacent a network entity to enable the monitoring of multiple network endpoints and, in some examples at least, the taking of remedial action such as interjecting packets into the monitored traffic (conversations).

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A network intercept device comprising:
    at least one processor, at least one storage device and at least one communication unit,
    wherein the at least one processor is configured to:
        monitor network traffic for a plurality of monitored endpoints in a communication network, at least some monitored endpoints of the plurality of monitored endpoints engaging in more than N conversations during a monitoring period;
        maintain respective bandwidth usage counters and decay counters in association with N conversations for each of the at least some monitored endpoints;
        receive network traffic for a new conversation for a particular monitored endpoint of the least some monitored endpoints, which new conversation is not one of the N conversations for which a bandwidth usage counter is being maintained; and
        in response to the network traffic for the new conversation: decay respective decay counters associated with each of the N conversations for the particular monitored endpoint; and replace a bandwidth usage counter, decay counter and association with one of the N conversations for the particular monitored endpoint with a bandwidth usage counter, decay counter and association with the new conversation when the decay counter of the one of the N conversations for the particular monitored endpoint is sufficiently decayed relative to a threshold.

2. The network intercept device of claim 1 wherein when replacing a bandwidth usage counter, decay counter and association with one of the N conversations for the particular monitored endpoint, the processor is configured to replace each respective decay counter with the a current value of the respective bandwidth usage counter to top up each decay counter for each other of the N conversations for the particular monitored endpoint.

3. The network intercept device of claim 1 wherein the processor is configured to store the respective bandwidth usage and decay counters for each monitored endpoint in a chain of up to N conversation entries by a source IP address of the monitored endpoint.

4. The network intercept device of claim 3 wherein each conversation entry in the chain further stores a respective destination IP address and port for a respective one of the up to N conversations.

5. The network intercept device of claim 4 wherein the processor is configured to:
    determine a source IP address, a destination IP address and port and a packet length or packet count by parsing a packet of the traffic, the source IP address identifying a respective monitored endpoint; and
    use the packet length or packet count to update the respective bandwidth usage and decay counters in a respective conversation entry in the chain for the respective monitored endpoint by using the destination IP address and port to locate the respective conversation entry.

6. The network intercept device of claim 5 wherein traffic is received for the new conversation when the respective conversation entry in the chain for the respective monitored endpoint cannot be located using the destination IP address and port.

7. The network intercept device of claim 6 wherein the processor is configured to use the packet length or packet count to decay each respective decay counter of the N conversations of the particular monitored endpoint.

8. The network intercept device of claim 6 wherein the one of the N conversations of the particular monitored endpoint is sufficiently decayed if the decay counter is at or below a threshold.

9. The network intercept device of claim 8 wherein the processor is configured to replace the conversation entry of the one of the N conversations in the chain with a conversation entry for the new conversation.

10. The network intercept device of claim 9 wherein the processor is configured to periodically review the bandwidth usage counters and determine and report bandwidth usage statistics for the up to N conversations per monitored endpoint.

11. The network intercept device of claim 10 wherein the processor is configured to take remedial action in respect of a particular conversation of one of the monitored endpoints in response to the bandwidth statistics for the particular conversation.

12. A method comprising:
monitoring, by at least one processor, network traffic for a plurality of monitored endpoints in a communication network, at least some monitored endpoints of the plurality of monitored endpoints engaging in more than N conversations during a monitoring period;
maintaining, by the at least one processor, respective bandwidth usage counters and decay counters in association with N conversations for each of the at least some monitored endpoints;
receiving, by the at least one processor, network traffic for a new conversation for a particular monitored endpoint of the least some monitored endpoints, which new conversation is not one of the N conversations for which a bandwidth usage counter is being maintained; and
in response to the receiving:
decaying, by the at least one processor, respective decay counters associated with each of the N conversations for the particular monitored endpoint; and
replacing, by at least one processor, a bandwidth usage counter, decay counter and association with one of the N conversations for the particular monitored endpoint with a bandwidth usage counter, decay counter and association with the new conversation when the decay counter of the one of the N conversations for the particular monitored endpoint is sufficiently decayed relative to a threshold.

13. The method of claim 12 wherein, when replacing a bandwidth usage counter, decay counter and association with one of the N conversations for the particular monitored endpoint, the method further comprises, for each other of the N conversations for the particular monitored endpoint, replacing each respective decay counter with the a current value of the respective bandwidth usage counter to top up each decay counter.

14. The method of claim 12 comprising storing, by the at least one processor, the respective bandwidth usage and decay counters for each monitored endpoint in a chain of up to N conversation entries by a source IP address of each of the monitored endpoint.

15. The method of claim 14 wherein each conversation entry in the chain further stores a respective destination IP address and port for a respective one of the up to N conversations.

16. The method of claim 15 comprising:
determining, by the at least one processor, a source IP address, a destination IP address and port and a packet length or packet count by parsing a packet of the network traffic, the source IP address identifying a respective monitored endpoint; and
using, by the at least one processor, the packet length or packet count to update the respective bandwidth usage and decay counters in a respective conversation entry in the chain for the respective monitored endpoint by using the destination IP address and port to locate the respective conversation entry.

17. The method of claim 16 wherein network traffic is received for the new conversation when the respective conversation entry in the chain for the respective monitored endpoint cannot be located using the destination IP address and port.

18. The method of claim 17 comprising using, by the at least one processor, the packet length or packet count to decay each respective decay counter of the N conversations of the particular monitored endpoint.

19. The method of claim 18 wherein the one of the N conversations of the particular monitored endpoint is sufficiently decayed if the decay counter is at or below the threshold.

20. The method of claim 19 wherein the replacing of the bandwidth usage counter and decay counter of one of the N conversations for the particular monitored endpoint with a bandwidth usage counter and decay counter associated with the new conversation is performed by replacing the conversation entry of the one of the N conversations in the chain with a conversation entry for the new conversation.

21. The method of claim 12 comprising in response to the monitoring period, reviewing, by the at least one processor, the bandwidth usage counters and determining and reporting bandwidth usage statistics for the up to N conversations per monitored endpoint.

22. The method of claim 21 comprising taking, by the at least one processor, remedial action in respect of a particular conversation of one of the monitored endpoints in response to the bandwidth statistics for the particular conversation.

23. A computer program product comprising a non-transitory computer readable medium storing instructions and/or data, which when executed by at least one processor of a network intercept device, configure the device to:
monitor network traffic for a plurality of monitored endpoints in a communication network, at least some monitored endpoints of the plurality of monitored endpoints engaging in more than N conversations during a monitoring period;
maintain respective bandwidth usage counters and decay counters in association with N conversations for each of the at least some monitored endpoints;
receive network traffic for a new conversation for a particular monitored endpoint of the least some monitored endpoints, which new conversation is not one of the N conversations for which a bandwidth usage counter is being maintained; and in response to the network traffic for the new conversation: decay respective decay counters associated with each of the N conversations for the particular monitored endpoint; and replace a bandwidth usage counter and decay counter of one of the N conversations for the particular monitored endpoint with a bandwidth usage counter and decay counter associated with the new conversation when the decay counter of the one of the N conversations for the particular monitored endpoint is sufficiently decayed relative to a threshold.

* * * * *